T. G. AULTMAN.
SELF LUBRICATING WHEEL.
APPLICATION FILED FEB. 27, 1908.
1,000,883.
Patented Aug. 15, 1911.
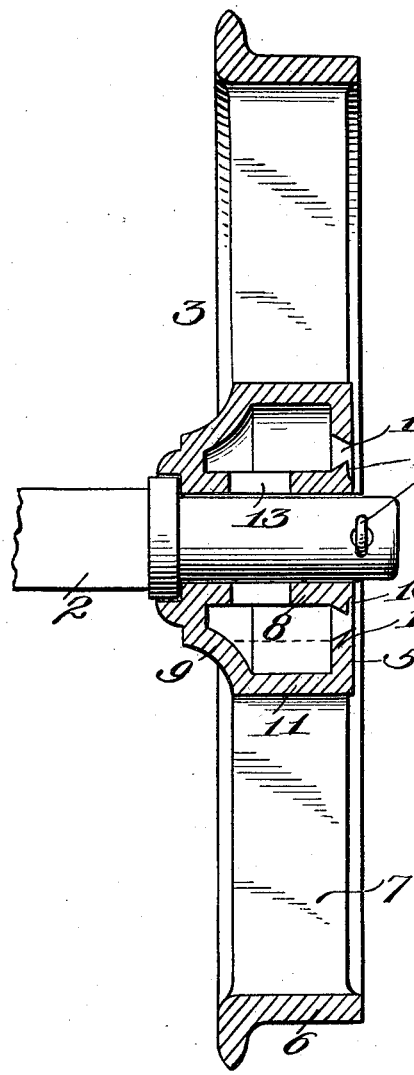
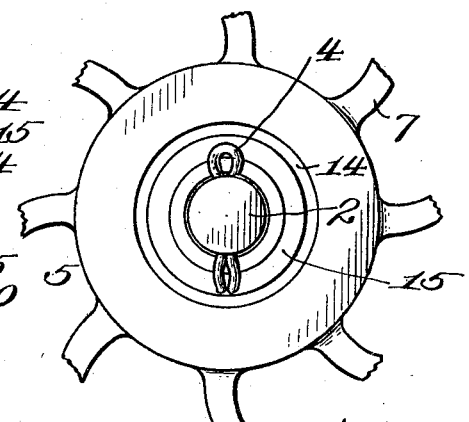
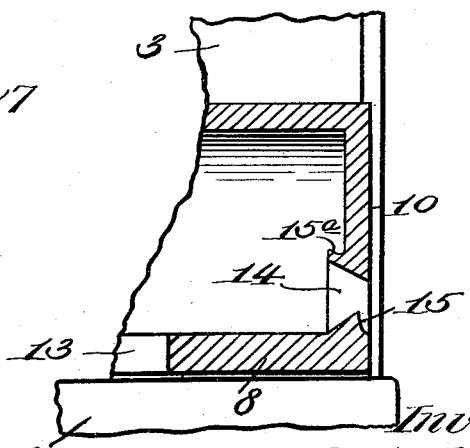
Witnesses:
Inventor
Thomas G. Aultman
By
James L. Norris
Atty.

UNITED STATES PATENT OFFICE.

THOMAS G. AULTMAN, OF FAIRMONT, WEST VIRGINIA.

SELF-LUBRICATING WHEEL.

1,000,883.   Specification of Letters Patent.   Patented Aug. 15, 1911.

Application filed February 27, 1908. Serial No. 418,098.

*To all whom it may concern:*

Be it known that I, THOMAS G. AULTMAN, a citizen of the United States, residing at Fairmont, in the county of Marion and State of West Virginia, have invented new and useful Improvements in Self-Lubricating Wheels, of which the following is a specification.

This invention relates to self-lubricating wheels.

My invention can be incorporated in any suitable character of wheel, although it is of particular utility when employed in connection with that class which rotates loosely on a shaft or journal and is held on the latter by a linch pin or other means.

A wheel involving my invention may be put to many advantageous uses; for example, it can be used in connection with vehicles such as cars. Said wheel includes in its make-up a boxing the interior of which presents a lubricating chamber. This boxing is of integral construction and has a circular opening so positioned as to circumscribe the axle or journal which rotatively carries the wheel, by virtue of which the latter can be oiled at any time irrespective of its rotative position. The walls of said opening are so formed as to prevent the leakage of oil or other lubricant from the lubricant reservoir or chamber either through said circular opening or from around the wearing surface of the axle or journal.

The invention therefore does not reside particularly in any form or construction of wheel but in a boxing constituting a part of such wheel. Therefore, outside of the boxing, the wheel may be of any desirable construction.

In the drawings accompanying and forming part of this specification I show in detail one form of embodiment of the invention which, to enable those skilled in the art to practice said invention, will be set forth at length in the following description, while the novelty of the invention will be included in the claims succeeding said description.

Referring to said drawings: Figure 1 is a central vertical sectional elevation of a wheel embodying my invention. Fig. 2 is a side elevation of the boxing thereof, and Fig. 3 is a sectional detail on an enlarged scale of a portion of said boxing showing a modification.

Like characters refer to like parts throughout the several figures.

In Fig. 1 of the drawings I have represented a shaft or axle as 2 on which a wheel such as that denoted in a general way by 3 directly rotates. The wheel may be held on the shaft, journal, or axle in any desirable way, for instance, by means of a linch-pin as 4. The wheel comprises a central boxing as 5, a rim as 6, and spokes as 7 connecting the boxing and rim, the whole being of integral construction. Except as to the boxing 5, the wheel may be of ordinary construction. The boxing, which, as will be clear, is integral, consists of a hub as 8, two side walls as 9 and 10, and a peripheral portion as 11 connecting said side walls 9 and 10, such boxing, as will be hereinafter evident, constituting a lubricant reservoir, the internal chamber in the boxing being adapted to receive a lubricant which may be of any desired nature. The normal level of the lubricant within the reservoir or boxing 5 is substantially up to the dotted line in Fig. 1. This lubricant is supplied to the journal portion of the axle 2 by means of ports as 13 of which there may be any desired number formed in the hub 8. These ports, as will be clear, lead from the lubricant chamber in the boxing or reservoir 5 to the journal portion of the axle 2. The lubricant is introduced into the interior of the boxing by way of an annular opening 14 which completely surrounds the hub 8 and is shown in the present instance as being formed in the outer wall 10 of the said hub. From this it will be clear that the said opening is formed wholly in a rotary or movable part of the wheel. The walls of said opening 14 are angular with respect to each other and diverge inwardly. During the rotation of the wheel it will be understood that oil flows down the outer face of the boxing 5, such oil passing onto the said face from the journal opening in the wheel. When the oil has traveled outwardly along the outer face of the boxing a short distance it will pass into the opening 14 and will flow against the outer inclined wall of said opening and be directed thereby into or returned to the chamber of the boxing. When I speak of the annular opening as being in the outer face of the wheel this is simply for illustration as the opening might be located on the inner face of the wheel.

The annular opening 14 by reason of its continuity always has some portion thereof in position with respect to the journal of the shaft or axle 2 to receive the oil oozing out from the opening in the hub 8 in which said journal is fitted, the inner wall of the opening 14 by reason of the formation of the gathering and guiding groove 15 depositing the oil running downwardly over the face of the hub onto the outer wall of the said opening 14 at a point inward from the adjacent face of the hub, and owing to the inclination of the said outer wall of the opening 14 the oil dripping thereon from the inner wall will be directed into the oil reservoir contained within the hub. The portion of the inner wall above the journal of the shaft or axle 2 by reason of the inclination of said inner wall will prevent the oil from flowing out through the said opening 14, and thus the two reversely inclined walls of the said latter opening will be effective in preventing the escape of the oil from the oil reservoir and also serve to effect a return of any oil leakage back into the reservoir.

The inner wall of the opening 14 as shown is intersected by the circular groove 15 into which the lubricant escaping from the wall by way of the journal opening is adapted to flow. By virtue of this groove I change the course of flow of the lubricant on the exterior of the wheel in such a way as to insure the said lubricant being directed with certainty against the outer inclined wall of said opening 14 and cause such oil to return into the chamber of the hub. The presence of this external circular groove 15 therefore makes the inner wall of the opening of less transverse extent than the outer wall, by virtue of which any leakage of oil or lubricant from the reservoir or boxing or from around the wearing surface of the axle or journal is returned to the interior of said reservoir or boxing with certainty.

As shown by Fig. 3, the outer wall of the opening terminates in an inner catching or guard groove 15ª which serves as a restrictive means to prevent the leakage or waste of the lubricant from the lubricant reservoir.

What I claim is:

1. A wheel of the class described provided with a lubricant reservoir having a plurality of ports for feeding the lubricant from the interior of the reservoir to the wearing surface of the axle or journal on which the wheel structure as a whole has rotating movement, the outer face of the reservoir being formed with an annular lubricant receiving opening extending continuously around the central portion of the wheel, the opposing walls of the annular opening diverging inwardly toward the reservoir and the wall of said opening nearer the center of the wheel operating to direct the lubricant thereon against the outer wall of the opening, and the said outer wall guiding the lubricant into the reservoir, the reservoir being integral with the rim of the wheel and forming the hub for the latter.

2. A wheel of the class described having a hub with a lubricant reservoir formed therein and provided with a plurality of ports for feeding the lubricant from the reservoir to the wearing surface of the axle or journal on which the wheel turns, the hub containing the reservoir and the remaining portion of the wheel being of integral construction, the outer face of the hub being formed with an annular lubricant receiving opening extending continuously around the hub center, the opposing walls of the said annular opening being diverged inwardly so as to contract the outer inlet portion of the said annular opening and enlarge the inner portion of the opening communicating with the reservoir, the wall of the annular opening nearer the center of the wheel operating to throw the lubricant running thereover against the outer wall of the said annular opening, the lubricant from the said outer wall of the annular opening being guided into the reservoir.

3. A wheel of the class described provided with a hub having a lubricant reservoir therein, the outer face of the hub having a circular lubricant receiving opening extending continuously around the center of the hub, the reservoir being provided with feeding means leading from the same to the axle or journal on which the wheel turns, the hub including the reservoir forming an integral part of the wheel and the said circular lubricant receiving opening having its opposite walls inclined from the outer face of the hub inwardly and the outer wall having a groove at its inner terminal and located at a distance from the adjacent inclined wall of the circular opening and fully exposed within the reservoir to prevent leakage of lubricant from the latter.

4. A wheel of the class described embodying a hub having a lubricant reservoir rotatable therewith, the reservoir being provided with a circular lubricant receiving opening continuously extending around the center of the hub, the walls of said opening being inclined and smooth and diverging inwardly, and the outer edge of the one wall of the opening projecting beyond the adjacent outer edge of the opposite wall of the said opening the shorter wall operating to direct the lubricant therefrom against the opposite longer wall and the latter in turn causing the lubricant to run into the reservoir.

5. A wheel of the class described of integral construction comprising a lubricant reservoir rotatable with the wheel and having a circular lubricant receiving opening, the walls of said opening being angular with respect to each other and diverging inwardly toward the interior of the reservoir, said reservoir having exteriorly thereof a circular groove intersecting the inner wall of said opening.

In testimony whereof I have hereunto set my hand in presence of two subscribing witnesses.

THOMAS G. AULTMAN.

Witnesses:
H. C. BROOKS,
C. L. FAUST.

Copies of this patent may be obtained for five cents each, by addressing the "Commissioner of Patents, Washington, D. C."